(12) United States Patent
Amminger

(10) Patent No.: US 10,772,262 B2
(45) Date of Patent: Sep. 15, 2020

(54) FACILITIES AND METHOD FOR CULTIVATING PLANTS

(71) Applicant: Thomas Amminger, Hart bei Graz (AT)

(72) Inventor: Thomas Amminger, Hart bei Graz (AT)

( * ) Notice: Subject to any disclaimer, the term of this patent is extended or adjusted under 35 U.S.C. 154(b) by 249 days.

(21) Appl. No.: 15/897,671

(22) Filed: Feb. 15, 2018

(65) Prior Publication Data

US 2018/0168110 A1 Jun. 21, 2018

Related U.S. Application Data

(63) Continuation of application No. PCT/EP2015/068867, filed on Aug. 17, 2015.

(51) Int. Cl.
*A01G 9/14* (2006.01)
*B65G 1/04* (2006.01)
(Continued)

(52) U.S. Cl.
CPC ............... *A01G 9/143* (2013.01); *A01G 9/14* (2013.01); *A01G 9/1423* (2013.01);
(Continued)

(58) Field of Classification Search
CPC ........ A01G 9/143; A01G 9/1423; A01G 9/14; A01G 9/16; B65G 1/0414
See application file for complete search history.

(56) References Cited

U.S. PATENT DOCUMENTS

2003/0162288 A1* 8/2003 Everett .................... A01G 7/04
435/292.1
2011/0120002 A1* 5/2011 Pettibone ............. A01G 31/042
47/65
(Continued)

FOREIGN PATENT DOCUMENTS

DE 102014011642 B3 10/2015
EP 0142643 A2 5/1985
(Continued)

OTHER PUBLICATIONS

EP 142643 A2, machine translation, 4 pages (Year: 1985).*
(Continued)

*Primary Examiner* — Monica L Barlow
(74) *Attorney, Agent, or Firm* — Seager, Tufte & Wickhem, LLP

(57) ABSTRACT

The present invention relates to facilities for cultivating plants, said facilities essentially consisting of a combination of a conventional greenhouse and a shelf that is preferably automatically operable. In this respect, particularly advantageous combinatorial effects are achieved which drastically increase the degree of volume utilization of greenhouses and simultaneously considerably reduce staff costs for cultivating plants as well as for the harvest. The degree of volume utilization is increased in that, instead of floor planting or plant tables that are usually provided in greenhouses, a shelf system that is arranged relatively densely to comes into use. Said shelf system comprises a plurality of longitudinal and transverse rows as well as a plurality of planes. Moreover, the supporting frame of the shelf system itself may be used as the supporting structure for the greenhouse.

14 Claims, 2 Drawing Sheets

(51) Int. Cl.
*B65G 1/06* (2006.01)
*A01C 21/00* (2006.01)
*A01G 9/20* (2006.01)
*A01G 9/24* (2006.01)

(52) U.S. Cl.
CPC ......... *B65G 1/0414* (2013.01); *B65G 1/0492* (2013.01); *B65G 1/065* (2013.01); *A01C 21/005* (2013.01); *A01G 9/20* (2013.01); *A01G 9/247* (2013.01); *Y02A 40/252* (2018.01)

(56) References Cited

U.S. PATENT DOCUMENTS

| | | | | |
|---|---|---|---|---|
| 2014/0017043 | A1* | 1/2014 | Hirai | A01G 31/02 414/267 |
| 2014/0259995 | A1* | 9/2014 | White | B64G 9/00 52/173.1 |
| 2014/0366443 | A1* | 12/2014 | Brusatore | A01G 22/00 47/66.7 |
| 2016/0014977 | A1* | 1/2016 | Esaki | A01G 9/246 47/66.6 |
| 2016/0236865 | A1* | 8/2016 | Altemir | B65G 1/0407 |
| 2016/0244260 | A1* | 8/2016 | Oshikawa | B65G 1/0407 |
| 2016/0355339 | A1* | 12/2016 | Peng | B65G 1/0457 |

FOREIGN PATENT DOCUMENTS

| | | |
|---|---|---|
| EP | 2712517 A1 | 4/2014 |
| EP | 2904894 A1 | 8/2015 |
| WO | 9955139 A1 | 11/1999 |
| WO | 2005118436 A1 | 12/2005 |
| WO | 2013113096 A1 | 8/2013 |

OTHER PUBLICATIONS

Notification Concerning Transmittal of International Preliminary Report on Patentability, International Application No. PCT/EP2015/068867, dated Mar. 1, 2018 (20 pgs.).
International Search Report, International Application No. PCT/EP2015/068867, dated Aug. 17, 2015 (7 pgs.).

* cited by examiner

FACILITIES AND METHOD FOR CULTIVATING PLANTS

PRIORITY DATA

This application is a continuation of International Application No. PCT/EP2015/068867, filed Aug. 17, 2015, the contents of which are herein incorporated by reference in their entirety.

TECHNICAL FIELD

The present invention relates to facilities and a method for cultivating plans, in particular in the form of a greenhouse, glasshouse, or hothouse.

BACKGROUND

The use of greenhouses is known, e.g., at places with unsuitable or suboptimal climatic circumstances in order to increase the harvest, to allow for the cultivation of specific crops, or to protect plants from extreme weather conditions. For this purpose, two major objects are often focused on. On the one hand, suitable conditions for growth such as soil conditions, soil humidity, and indoor climate (e.g., lighting, air humidity, temperature, and air movement) must be created. On the other hand, a greenhouse must be designed such that it withstands the static loads that occur due to the structure and design of the greenhouse itself, the planting, and the environmental impacts.

For this purpose, a common greenhouse customarily comprises a supporting structure (e.g., made of wood, steel, or aluminum) resting on a base. Said supporting structure is provided with a translucent roofing made of glass panes, plastic films (e.g., of PVC or PE), or plastic plates (e.g., plastic glass (PMMA), polycarbonate, fiber-reinforced polyester, or PVC). Cultivated areas for plants to be grown are provided in the greenhouse.

With respect to the cultivated areas, difference is made between, e.g., types of beds, tables, or suspended constructions. Floor beds are directly connected to the natural soil, whereas the cultivated substrate layer of in-ground beds is separated from the natural soil by an impervious layer made of concrete or foil. In raised beds, the culture medium is embedded into troughs generally made of concrete so that the substrate layer does not come into contact with the natural soil, either. The cultivation of plants on tables comes into use with potted plants, wherein the tables are either stationary or movable for increased space utilization by eliminating aisles. Although hangers may allow for increased usable spaces by using spaces above the beds or tables, they entail an impedance of the incident light on lower cultivated areas, and crop maintenance is more cumbersome.

What is more, many greenhouses are provided with ventilation means in order to influence the oxygen and carbon dioxide contents of the greenhouse air and to regulate the temperature. Irrigation and/or sprinkling systems, means for shading or darkening, lighting systems for artificially lighting crops, $CO_2$ fertilization means for carbon dioxide fertilization, and combined heat and power plants are further constituents of greenhouses.

Since in known greenhouses the floor areas or plant tables or simple suspended constructions or shelf constructions are primarily used, the degree of volume utilization of conventional greenhouses is rather small.

SUMMARY

The present invention is based on the object of making greenhouses more usable, in particular providing for greenhouses with an increased degree of volume utilization in which preferably simplified and improved cultivation of plants is additionally ensured therein. This object is achieved with the features of the independent claims. Preferred embodiments are defined in the dependent claims.

For this purpose, the gist of the present invention is to provide facilities that essentially consist of a combination of a conventional greenhouse and a shelf that is preferably automatically operable. In this respect, particularly advantageous combinatorial effects are achieved which drastically increase the degree of volume utilization of greenhouses and simultaneously considerably reduce staff costs for cultivating plants as well as for the harvest.

The degree of volume utilization is increased in that instead of floor planting or plant tables that are usually provided in greenhouses, a shelf system that is arranged relatively densely comes into use. Said shelf system comprises a plurality of longitudinal and transverse rows as well as a plurality of planes. Moreover, the supporting frame of the shelf system itself is used as the supporting structure for the greenhouse.

The present invention relates to a greenhouse with a supporting structure and a translucent roofing, wherein the roofing limits the greenhouse to the outside and is supported by the supporting structure, and a shelf system which comprises an arrangement of shelves with a plurality of planes. The shelves are arranged such that they form aisles in the longitudinal and transverse directions. In this regard, the supporting structure of the greenhouse is entirely provided by the shelf system, i.e., the actual greenhouse and/or the translucent roofing do not comprise a supporting structure on their own but are rather only supported by the shelf system.

The shelves are preferably arranged such that aisles in the longitudinal direction and the transverse direction are formed. For this purpose, shelves of a single and/or multiple depths may be provided between adjacent shelf aisles.

It is particularly preferred to use an automatically operable shelf system with at least one shelf vehicle, wherein the shelf vehicle may, e.g., put seed stock into a storage place in the shelf system or fetch it therefrom. The shelf vehicle may also be used for inspection purposes, for instance, testing for pest infestation, measuring the degree of humidity, determining the degree of ripeness of pieces of fruit etc., and/or carrying out operational steps.

The invention further relates to a greenhouse with a supporting structure and a translucent roofing, wherein the roofing limits the greenhouse to the outside and is supported by the supporting structure, and an automatically operable shelf system which comprises an arrangement of shelves with a plurality of planes. The shelves are arranged such that they form aisles in the longitudinal and transverse directions. The automatically operable shelf system comprises at least one, preferably driverless, longitudinally and transversely movable shelf vehicle by means of which seed stock may be put into a storage place in the shelf system or fetched therefrom. As an alternative or in addition thereto, the shelf vehicle may also be used for inspection purposes, for instance, testing for pest infestation, measuring the degree of humidity, determining the degree of ripeness of pieces of fruit etc., and/or carrying out operational steps.

According to this embodiment, the shelves are also preferably arranged such that shelf aisles in the longitudinal direction and the transverse direction are formed, wherein shelves of a single and/or multiple depths are provided between adjacent shelf aisles.

The greenhouses according to the invention may further comprise at least one lifting equipment by means of which the at least one shelf vehicle may be transported between different planes of the shelf system, or wherein the at least one shelf vehicle is designed to switch from one shelf plane to another plane by itself.

What is more, in the greenhouses according to the invention, a work area may preferably further be provided in the greenhouse, with seed stock from the shelves of the shelf system being able to be transported to and from said work area with the help of the at least one shelf vehicle.

The at least one shelf vehicle may preferably be configured such that the seed stock does not have to be taken out of the shelf for every operation, but that work may rather be done automatically on the seed stock.

Furthermore, the greenhouses according to the invention may be provided with one or more means for moving seed stock from the respective shelves to different places in the greenhouse in order for the seed stock to be provided with, inter alia, sufficient light, water, and/or fertilizer.

By means of the automatic, preferably computer-controlled operation of the shelf system, all the work to be done in the greenhouse, from sowing to harvesting, may considerably be facilitated. For instance, for the work to be done, the plants may be taken to ergonomic workplaces automatically (e.g., upon request). On the one hand, strenuous work which must typically be done on the floor may thus be done at comfortable working heights. On the other hand, stationary machines or robots may be used, e.g., for planting or harvesting, or for examining plants, thus achieving a higher economic efficiency compared to conventional greenhouses.

The shelf system is thus preferably configured such that the shelf system may be frequented both in the longitudinal and the transverse direction by one or more shelf vehicles. Additionally, one or more lifting equipments may be provided by means of which shelf vehicles may be moved between different planes of the shelf system. As an alternative, the shelf vehicles may switch from one shelf plane to another plane by themselves.

In accordance with one embodiment of the present invention, particularly shelf systems as described in WO 2005/118436 A1 may advantageously be used for the present invention. With the help of such a system, the shelf vehicles may reach any position in the shelf, thus enabling the handling of locations in the shelf of any number by, e.g., only few shelf vehicles.

The facilities, i.e., greenhouses according to the present invention may generally be of any dimensions and shapes. High greenhouses, i.e., multilevel greenhouses, with a high degree of volume utilization are feasible, too. All common materials may be used as a translucent roofing, e.g., glass panes, plastic films (e.g., of PVC or PE), or plastic plates (e.g., plastic glass (PMMA), polycarbonate, fiber-reinforced polyester, or PVC).

The greenhouses according to the invention may further comprise, e.g., in the region of the shelf, directly in the shelf and/or centrally, installations for creating suitable ambient conditions in order to increase growth and harvest of the plants.

BRIEF DESCRIPTION OF THE DRAWINGS

In the following, an embodiment of the greenhouse according to the invention is exemplarily shown with the help of the Figures. The Figures show.

DETAILED DESCRIPTION

Figure 1:
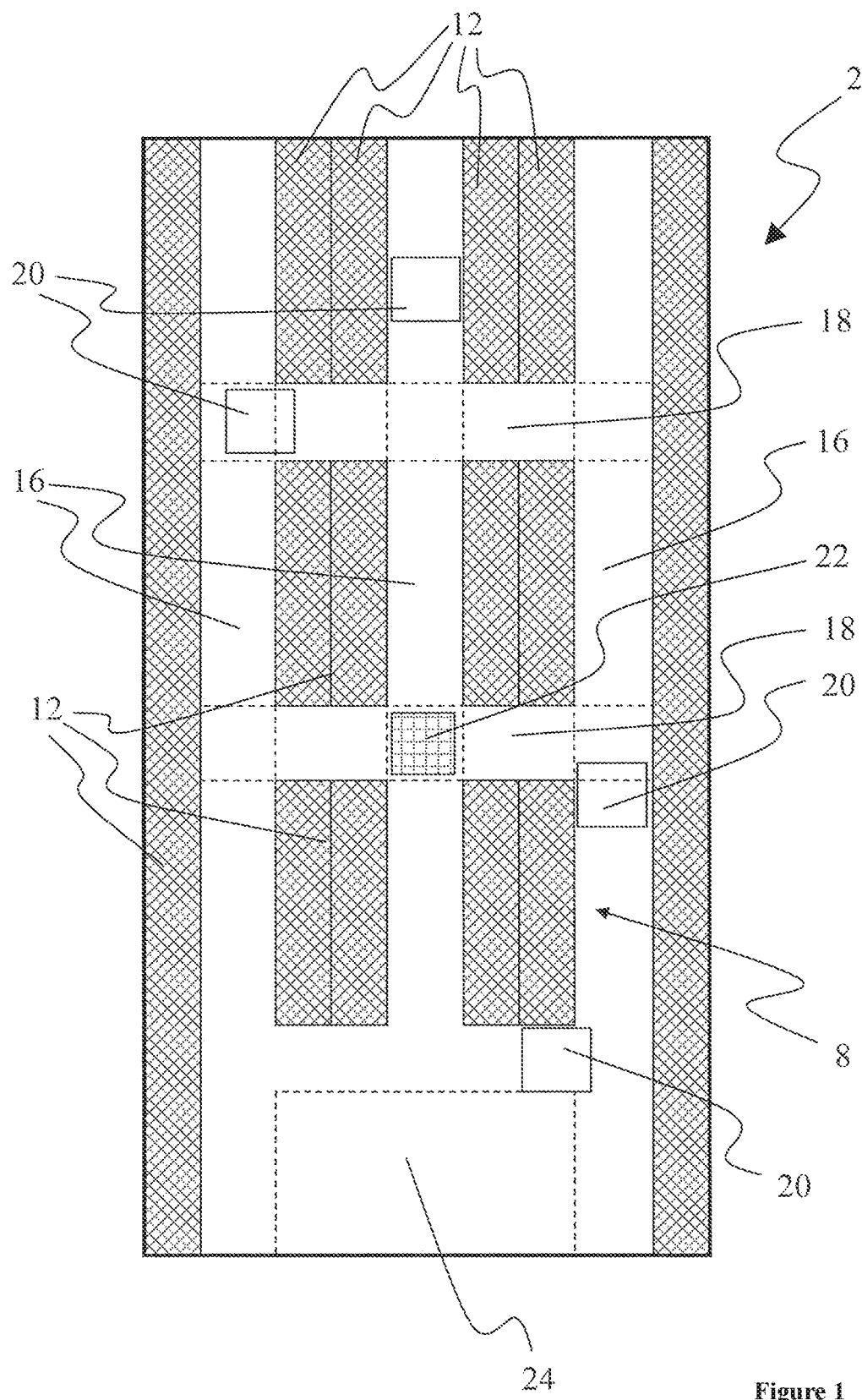
FIG. 1 is a schematic top view of the shelf system within an embodiment of a greenhouse according to the invention.
Figure 2:
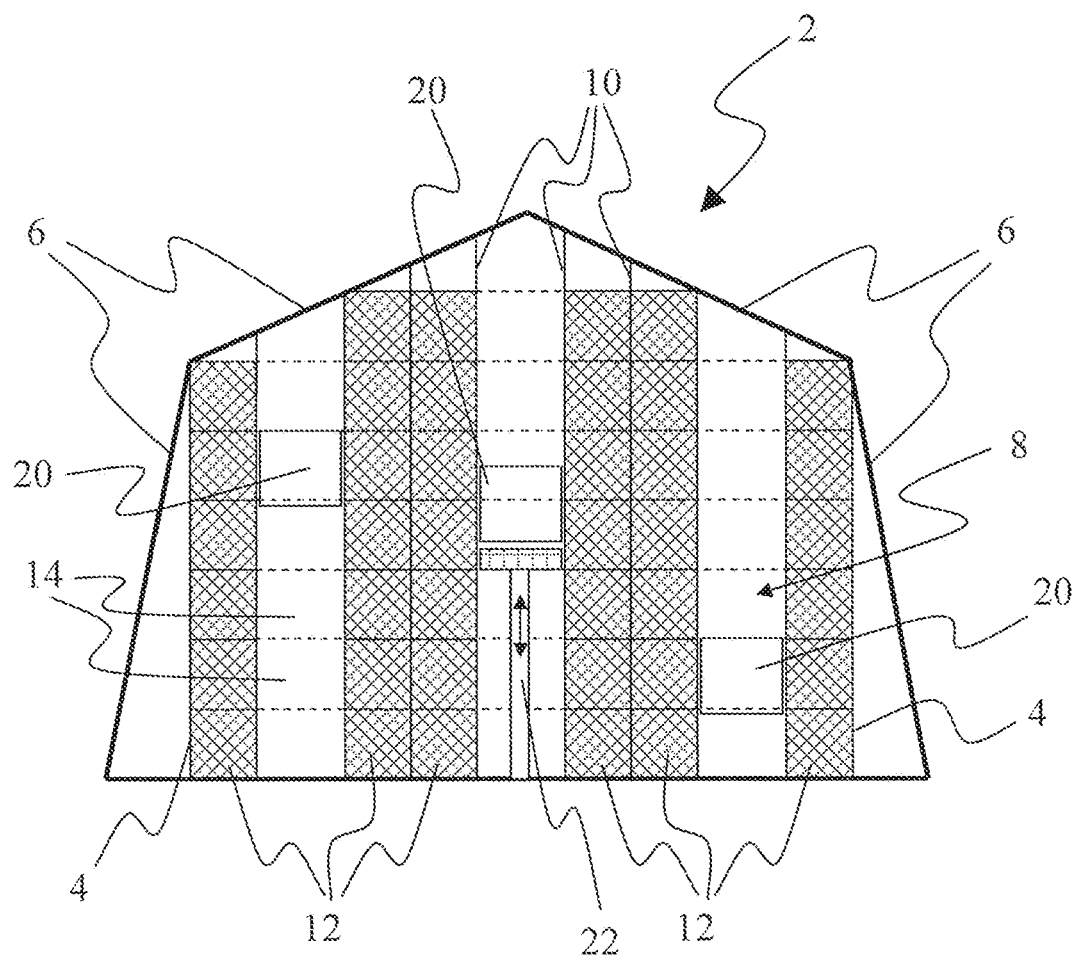
FIG. 2 is a schematic lateral view of the greenhouse according to FIG. 1.

The greenhouse 2 shown in FIGS. 1 and 2 has a supporting structure 4 and a translucent roofing 6. The roofing 6 limits the greenhouse 2 in an essentially conventional way to the outside. The roofing 6 is formed from a translucent material, e.g., from glass panes, plastic films (e.g., of PVC or PE), or plastic plates (e.g., plastic glass (PMMA), polycarbonate, fiber-reinforced polyester, or PVC). The greenhouse 2 is provided with a shelf system 8 that may at the same time form the supporting structure 4 for the greenhouse. Unlike in conventional greenhouses, the supporting structure 4 provided by the shelf system 8 does not have to make do without or with a minimum number of supports but may be designed considerably more flexibly and at a reduced rate by using the shelf stands and/or shelf supports as static elements. The use of a plurality of supports is possible without restricting the degree of utilization of the greenhouse since the shelf system itself comprises shelf stands anyway. Said shelf stands are, e.g., simply extended towards the roof construction, as is indicated in FIG. 2 with the help of reference numerals 10, in order to support the roofing 6 of the greenhouse 2. Thus, the shelf system 8 is so to speak the supporting part of the greenhouse 2.

The shelf system 8 comprises an arrangement of shelves 12 and defines a plurality of planes 14. The shelves 12 are arranged such that they form shelf aisles, preferably longitudinal aisles 16 and transverse aisles 18. The longitudinal and transverse aisles 16, 18 are preferably arranged at right angles to each other. While shelves 12 of simple depths are shown in the illustrated embodiment, shelves of multiple depths may also be provided between adjacent shelf aisles in the scope of the invention.

Preferably, the shelf system 8 is an automatically operable shelf system with at least one shelf vehicle 20. In FIGS. 1 and 2, three of such shelf vehicles are illustrated schematically. According to an embodiment of the invention, the shelf system 8 is configured in accordance with WO 2005/118436 A1 and may, e.g., have autonomously driving shelf vehicles 20 which may move freely between the different longitudinal and transverse aisles 16, 18. The shelf vehicles 20 are configured such that they may undertake different tasks for cultivating plants in the greenhouse 2. In particular, it may be of importance to reposition plants in certain intervals in order to ensure, e.g., that all plants receive sufficient light. The shelf vehicles 20 are particularly designed to put seed stock into a storage place in the shelf system 8 or to fetch it therefrom. As an alternative or in addition thereto, the shelf vehicle 20 may also be used for inspection purposes, for instance, testing for pest infestation, measuring the degree of humidity, determining the degree of ripeness of pieces of fruit etc., and/or carrying out operational steps (e.g., turning the plants). Different shelf vehicles 20 may also come into use, wherein different tasks may be accomplished therewith.

The greenhouses 20 according to the invention may further comprise at least one lifting equipment 22 by means of which the shelf vehicles 20 may be driven up and down between different planes 14 of the shelf system 8. For instance, this may be done in the sense of an elevator. As an alternative, the shelf vehicles 20 themselves may be designed such that they may switch from one shelf plane 14 to another plane 14.

Moreover, at least one work area 24 may further be provided in the greenhouses 2 according to the invention, with seed stock from the shelves 12 of the shelf system 8 being able to be transported to and from said work area with the help of the shelf vehicles 20. A different array of works may be done manually or automatically (e.g., with the help of robots) in such a work area 24. For this purpose, the shelf vehicles 20 take the seed stock to the work area 24 and place it there. Preferably, seed stock that has already been worked on is collected immediately afterward and taken to a suitable position in the shelf system 8.

Thus, the present invention provides a greenhouse that combines the advantages of a conventional greenhouse with those of automatically operable shelf systems. In doing so, particularly advantageous combinatorial effects are achieved which drastically increase the degree of volume utilization of greenhouses, at the same time considerably reduce staff costs for cultivating plants and harvest, facilitate the construction of greenhouses, and make greenhouses utilizable from an economic point of view especially in geographical locations where they could otherwise not be used.

By way of the automatic, preferably computer-controlled operation of the shelf system 8, all the work to be done in the greenhouse 2, from sowing to harvesting, may considerably be facilitated. For instance, for the work to be done, the plants may be taken to ergonomic workplaces 24 automatically (e.g., upon request). On the one hand, strenuous work which must typically be done on the floor may thus be done at comfortable working heights. On the other hand, stationary machines or robots may be used, e.g., for planting or harvesting, or for examining plants, thus achieving a higher economic efficiency compared to conventional greenhouses.

What is claimed is:

1. A greenhouse comprising:
    a supporting structure and a translucent roofing, wherein the translucent roofing limits the greenhouse to the outside and is supported by the supporting structure; and
    a shelf system comprising an arrangement of shelves with a plurality of planes,
    wherein the shelves are arranged such that they form shelf aisles in a longitudinal direction between opposite shelves and shelf aisles in a transverse direction between adjacent shelves,
    wherein the supporting structure of the greenhouse is formed by the shelf system,
    wherein the shelf system is an automatically operable shelf system and comprises at least one driverless shelf vehicle freely movable in the shelf aisles in the longitudinal and transverse directions and by means of which seed stock may be put into a storage place in the shelf system or fetched therefrom.

2. The greenhouse according to claim 1, wherein the shelves are arranged such that shelf aisles in the longitudinal direction and the transverse direction are formed, wherein shelves of single or multiple depths are provided between adjacent shelves.

3. The greenhouse according to claim 1, wherein further at least one lifting equipment is provided by means of which the at least one shelf vehicle may be transported between different planes of the shelf system, or wherein the at least one shelf vehicle is designed to switch from one shelf plane to another plane by itself.

4. The greenhouse according to claim 1, wherein further a work area is provided in the greenhouse, with seed stock from the shelves of the shelf system being able to be transported to and from said work area with help from the at least one shelf vehicle.

5. The greenhouse according to claim 1, wherein the at least one shelf vehicle is configured such that the seed stock does not have to be taken out of the shelves for every operation, but that work may rather be done automatically on the seed stock.

6. The greenhouse according to claim 1, further with a means for moving seed stock from the respective shelves to different places in the greenhouse in order for the seed stock to be provided with, inter alia, sufficient light, water, and/or fertilizer.

7. A greenhouse comprising:
    a supporting structure and a translucent roofing, wherein the translucent roofing limits the greenhouse to the outside and is supported by the supporting structure; and
    an automatically operable shelf system comprising an arrangement of shelves with a plurality of planes, wherein the shelves are arranged such that they form shelf aisles in a longitudinal direction between opposite shelves and shelf aisles in a transverse direction between adjacent shelves, wherein the automatically operable shelf system comprises at least one longitudinally and transversely movable driverless shelf vehicle by means of which seed stock may be put into a storage place in the shelf system or fetched therefrom.

8. The greenhouse according to claim 7, wherein the shelves are arranged such that shelf aisles in the longitudinal direction and the transverse direction are formed, wherein shelves of single or multiple depths are provided between adjacent shelf aisles.

9. The greenhouse according to claim 8, wherein further at least one lifting equipment is provided by means of which the at least one shelf vehicle may be transported between different planes of the shelf system, or wherein the at least one shelf vehicle is designed to switch from one shelf plane to another plane by itself.

10. The greenhouse according to claim 9, wherein the supporting structure of the greenhouse is formed by the shelf system.

11. The greenhouse according to claim 7, wherein the supporting structure of the greenhouse is formed by the shelf system.

12. The greenhouse according to claim 7, wherein further a work area is provided in the greenhouse, with seed stock from the shelves of the shelf system being able to be transported to and from said work area with help from the at least one shelf vehicle.

13. The greenhouse according to claim 7, wherein the at least one shelf vehicle is configured such that the seed stock does not have to be taken out of the shelves for every operation, but that work may rather be done automatically on the seed stock.

14. The greenhouse according to claim 7, further with a means for moving seed stock from the respective shelves to different places in the greenhouse in order for the seed stock to be provided with, inter alia, sufficient light, water, and/or fertilizer.

* * * * *